(12) United States Patent
Bendel

(10) Patent No.: US 8,985,287 B2
(45) Date of Patent: Mar. 24, 2015

(54) DEVICE FOR ACTIVELY INFLUENCING VIBRATIONS IN A COMPONENT

(75) Inventor: Karl Bendel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1967 days.

(21) Appl. No.: 11/901,804

(22) Filed: Sep. 18, 2007

(65) Prior Publication Data

US 2008/0073820 A1 Mar. 27, 2008

(30) Foreign Application Priority Data

Sep. 25, 2006 (DE) .......................... 10 2006 045 158

(51) Int. Cl.
*F16F 9/32* (2006.01)
*F16F 15/00* (2006.01)
*H01L 41/08* (2006.01)

(52) U.S. Cl.
CPC ............... *F16F 15/005* (2013.01); *H01L 41/08* (2013.01)
USPC .......... 188/266.7; 381/74.4; 381/86; 381/190

(58) Field of Classification Search
CPC ...... H04R 17/00; H04R 17/005; H04R 17/08; F16F 15/002; F16F 15/005; F16F 15/007
USPC ............. 188/378, 267.7, 140.11, 136, 266.7; 381/71.1, 71.2, 71.4, 71.7, 86, 190; 267/140.11

See application file for complete search history.

(56) References Cited

U.S. PATENT DOCUMENTS

| | | | |
|---|---|---|---|
| 5,734,246 A * | 3/1998 | Falangas ....................... | 318/649 |
| 6,639,988 B2 * | 10/2003 | Ashtiani et al. ................ | 381/86 |
| 6,658,118 B1 * | 12/2003 | Kumar et al. ................. | 381/71.1 |
| 6,853,315 B2 * | 2/2005 | Schiller et al. ................ | 340/974 |
| 7,222,704 B2 * | 5/2007 | Pearson et al. ................ | 188/378 |
| 2002/0076061 A1 * | 6/2002 | Ashtiani et al. ................ | 381/86 |
| 2005/0284713 A1 * | 12/2005 | Fischer ....................... | 188/266.7 |

FOREIGN PATENT DOCUMENTS

DE 195 31 402 2/1997

* cited by examiner

*Primary Examiner* — Vishal Sahni
(74) *Attorney, Agent, or Firm* — Kenyon & Kenyon LLP

(57) ABSTRACT

A device for actively influencing vibrations in a component, in particular vibrations in a component of a motor vehicle such as engine vibrations, for example. The device includes a sensor for detecting the vibrations, an actuator which acts on the component, and a regulation and control unit in which actuating signals may be generated from the sensor signals in order to adjust the actuator. The actuator is designed as an electrically actuatable piezoelectric actuator.

8 Claims, 1 Drawing Sheet

DEVICE FOR ACTIVELY INFLUENCING VIBRATIONS IN A COMPONENT

BACKGROUND INFORMATION

A device is described in German Patent No. DE 195 31 402. The device is used for manipulating noise, in particular for minimizing vibrational noise transmitted in the passenger compartment of motor vehicles. By use of microphones which act as vibration sensors, vibrations in the audible range are measured and undergo evaluation in a regulation and control unit, actuating signals for impingement on a speaker being generated as a function of the measured vibration pattern in the regulation and control unit. The speaker functions as a vibration generating unit, and in response to the measured sound vibrations generates a specific vibration pattern which is superimposed on the vibration pattern of the primary source of sound. The superimposition results in interference, for example, thereby eliminating or at least reducing the sound vibrations perceived by the vehicle occupants. However, vibration modulation is also possible, for example in order to generate a desired acoustic pattern of the engine in the vehicle interior.

SUMMARY OF THE INVENTION

On the basis of this related art, an object of the present invention is to influence the vibrations in a component, in particular radiated audible vibrations, using simple measures. The aim is to advantageously provide a variety of options for manipulation.

This object is achieved according to the present invention.

In the device according to the present invention for actively influencing vibrations in a component, a sensor for detecting vibrations is provided, whose signals are supplied to a regulation and control unit in which actuating signals may be generated from the sensor signals in order to adjust the actuator. This actuator is designed as an electrically actuatable piezoelectric actuator. Such piezoelectric actuators make use of the piezoelectric effect, which describes a relationship between mechanical pressure and electrical voltage in a solid body. The piezoelectric actuator may be designed in such a way that, when a voltage is applied, the geometry of the piezoelectric actuator is altered; i.e., the dimension of the actuator is changed in at least one direction. In this manner it is possible to change the shape of the piezoelectric actuator by manipulating the applied voltage. Such piezoelectric actuators are characterized by a very quick response to the change in voltage. A vibration-type voltage excitation correspondingly results in a corresponding vibration-type change in shape, which may be exploited for generating and thus also manipulating vibrations.

In the device according to the present invention, the vibrations may be influenced directly in the affected component, which is advantageous, for example, when intervention is to be made directly at the location where the sound originates. It is also possible to generate vibrations in a second component by use of the piezoelectric actuator(s), the vibrations from the second component being superimposed on the vibrations from the primary vibration source in order to obtain a desired vibration pattern. This type of vibration manipulation is equivalent to manipulating an additional source of sound such as, for example, a speaker, the sound from which is superimposed on the primary source of sound. This type of vibration manipulation with superimposed acoustic fields is also referred to as active noise control (ANC).

However, noise may also be reduced or manipulated by using piezoelectric actuators according to other operating principles. Operation in the form of an active absorber (AA) may be considered, in which noise is absorbed by minimizing the acoustic pressure, not in the surrounding space in which the sound waves propagate but, rather, directly on the surface of the actuator, where the noise is virtually "swallowed up." For example, in motor vehicles the piezoelectric actuators are installed in the engine compartment, in particular in the cylinder head cover, in addition or as an alternative to speakers, the piezoelectric actuators being mounted in such a way that the surfaces that are influenced by the piezoelectric oscillations are bent in a localized area by the actuators and thereby deflected.

According to a further method, by use of the piezoelectric actuators the interfering vibrations are suppressed by dynamically reinforcing the surface of the component (active vibration control (AVC)). The piezoelectric actuators may be mounted on the sound-radiating surfaces in such a way that these surfaces may be bent in a localized area against the deflection that is responsible for the sound radiation, thereby preventing the deflection.

According to another method, no additional acoustic field is generated by use of the piezoelectric actuators; instead, the dynamics of the sound-radiating surface are altered in such a way that only a minimum sound level is generated (adaptive structural acoustic control (ASAC)). The piezoelectric actuators are mounted on the sound-radiating surface in such a way that their type of vibrations, in particular the natural type of vibrations, is suppressed in the frequency range of the interfering noise and replaced by a type of vibrations which does not radiate as much.

According to the active noise control (ANC) method, a second acoustic field is superimposed on the interfering acoustic field which, at least at certain frequencies, lowers the sound level via superposition. In this case the piezoelectric actuators are mounted on sound-radiating surfaces of other components in such a way that these surfaces are bent in localized areas by the actuators and thereby deflected, and radiate airborne noise in the manner of membrane or bending wave converters. To ensure that the radiation preferably occurs only in the direction of the source of sound to be minimized, sound-minimizing measures, such as insulation, for example, may be provided on the back side of the second component.

In addition to the piezoelectric actuators, other actuators, for example speakers, may be provided which together with the piezoelectric actuators counteract the acoustic field.

Microphones are preferably used as sensors for detecting the vibrational field. However, piezoelectric elements may also be considered as sensors, in which, in contrast to the active piezoelectric actuators, use is made of the piezoelectric effect in the opposite direction, namely, in such a way that the vibrations result in a change in shape of the piezoelectric element, which involves a voltage change which represents the sensor signal to be evaluated in the regulation and control unit.

It may be practical to provide not just one but multiple piezoelectric actuators, for example two symmetrically situated piezoelectric actuators, to allow generation of a uniform vibration pattern. The position of the piezoelectric actuator(s) on the component may either be provided directly on the surface of the component or, according to a further embodiment, the piezoelectric actuator(s) are inserted into the wall of the component.

DETAILED DESCRIPTION

Figure 1:
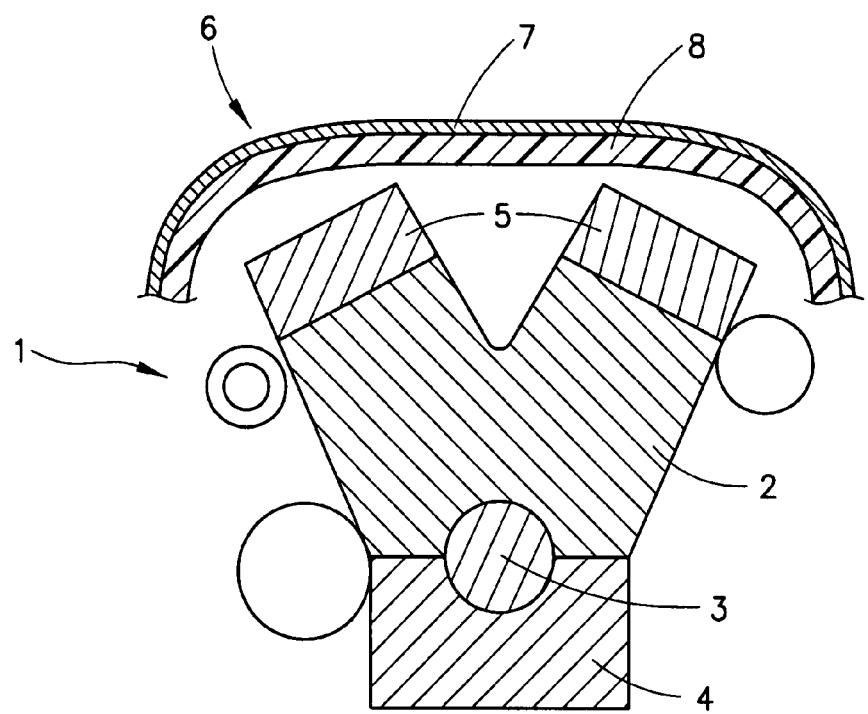
FIG. 1 shows a schematic illustration of a section of an internal combustion engine and a cylinder head cover which covers the internal combustion engine.

V-shaped reciprocating internal combustion engine 1 illustrated in FIG. 1 has an engine block 2, a crankshaft 3, a crankcase 4, and two cylinder heads 5 on account of the V shape. Internal combustion engine 1 is covered by a cylinder head cover 6 having a wall 7 which is provided with an insulating layer 8, a foam layer, for example, on the side facing internal combustion engine 1. Cylinder head cover 6 typically rests on cylinder heads 5, with the result that vibrations emanating from the engine are also transmitted to the cylinder head cover. At the same time, the cylinder head cover is also set into vibration by sound waves radiated from the internal combustion engine. These vibrations may generate audible sound waves via the cylinder head cover which represent an unpleasant noise burden. To reduce the acoustic field emanating from the cylinder head cover, and optionally to completely or at least substantially eliminate certain frequencies, in particular those below 1000 Hz, a device is provided for actively influencing the vibrations in the cylinder head cover, as illustrated in detail in FIG. 2.

Figure 2:
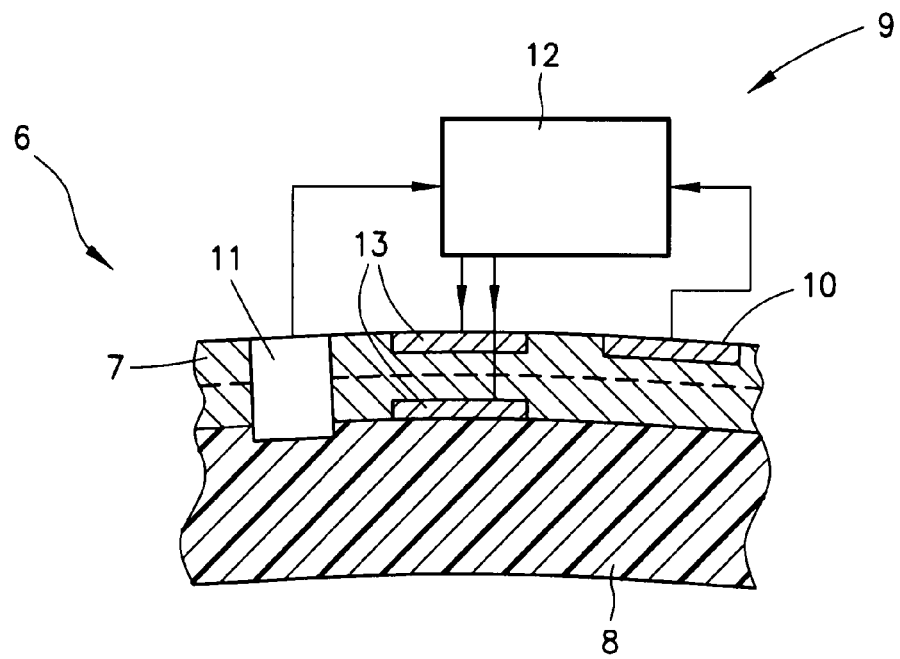
FIG. 2 shows an enlarged illustration of a portion of the cylinder head cover, having an active device for influencing vibrations in the cylinder head cover.

As shown in FIG. 2, a device, denoted in general by reference numeral 9, is provided in or on wall 7 of cylinder head cover 6 for actively influencing vibrations in the cylinder head cover. This device 9 includes two sensors 10 and 11 for detecting the vibrations in cylinder head cover 6, a regulation and control unit 12 for evaluating the signals from sensors 10 and 11 and for generating actuating signals, and piezoelectric actuators 13 which are located in or on wall 7 and which may be adjusted via the actuating signals from regulation and control unit 12. It is practical for sensor 10 to likewise be a piezoelectric element which changes its geometric shape as the result of vibrations in the cylinder head cover, a change in voltage thereby being applied to this piezoelectric element, the change in voltage being supplied as a sensor signal to regulation and control unit 12. Second sensor 11 is a microphone which picks up sound waves, the sensor signals from microphone 11 likewise being supplied to regulation and control unit 12.

More than two sensors may optionally be provided, which in particular may include three different types of sensors: the first are microphones which directly detect the acoustic pressure and which are separately mounted above or also within the cylinder head cover. On the other hand, piezoelectric actuators may be mounted on or in the cover to detect the type of vibration of the cover. With the support of models, this information may be used to generate suitable countervibrations. Lastly, as an alternative or in addition to the piezoelectric sensors, which detect the type of vibration based on changes in the lengths of the structure, acceleration sensors may be used which detect the same type of vibration based on localized deflections.

The recorded sensor signals are evaluated in regulation and control unit 12. As a function of the recorded vibration or acoustic pattern, actuating signals are generated which are supplied to the active elements of device 9, i.e., piezoelectric actuators 13. These actuating signals are generated in the form of electrical voltage, each change in voltage resulting in a change in shape of piezoelectric actuators 13, and this change in shape influencing the vibration pattern of the primary vibrations in the cylinder head cover. Thus, for example, piezoelectric actuators 13 may generate vibrations in wall 7 which counteract the primary vibrations to be minimized. Static deformation of wall 7 may also be used to strain the wall and thus prevent the propagation of the primary vibrations.

In the exemplary embodiment two piezoelectric actuators 13 are illustrated, each introduced into wall 7 but being located close to the surface at opposite sides of wall 7. Placement directly on the surface, for example in a receptacle provided in wall 7, is also possible, as well as complete integration into wall 7, so that the piezoelectric element is completely enclosed by the wall material.

Furthermore, it may be practical to provide a symmetrical configuration of multiple piezoelectric elements relative to an axis of symmetry or plane of symmetry of component 6. For example, piezoelectric actuators may be situated in the left and right side regions of cylinder head cover 6.

Besides the piezoelectric actuators, additional actuators may be provided which are designed according to physically different operating principles. For example, a speaker may be considered whose sound waves are transmitted to component 6 to superimpose the acoustic pattern from the speaker on the acoustic pattern of the primary vibrations.

The device for actively influencing vibrations is advantageously used for flat components in the engine compartment, in particular for cylinder head covers.

What is claimed is:

1. A system, comprising:
   a component; and
   a device for actively influencing vibrations in the component, comprising:
   a first sensor including a microphone;
   a second sensor including a piezoelectric sensor configured for detecting the vibrations;
   an electrically actuatable piezoelectric actuator configured for acting on the component; and
   a regulation and control unit in which actuating signals are generated from sensor signals of one of the first sensor and the second sensor in order to adjust the actuator;
   wherein the microphone, the piezoelectric sensor, and the actuator are embedded within a material of a wall of the component influenced by the vibrations.

2. The system according to claim 1, wherein the vibrations are engine vibrations of a motor vehicle.

3. The system according to claim 1, wherein the piezoelectric actuator includes a piezoelectric ceramic plate.

4. The system according to claim 1, wherein the piezoelectric actuator includes a piezoelectric film.

5. The system according to claim 1, wherein the piezoelectric actuator includes a piezoelectric fiber.

6. The system according to claim 1, wherein at least two piezoelectric actuators are situated at a predetermined distance from one another.

7. The system according to claim 1, further comprising a speaker provided as an additional actuator.

8. The system according to claim 1, wherein the device is used for influencing a vibration in a cylinder head cover of an internal combustion engine.

* * * * *